(12) United States Patent
Dwarakanath et al.

(10) Patent No.: US 10,050,825 B2
(45) Date of Patent: Aug. 14, 2018

(54) METHOD AND EQUIPMENT FOR THROUGHPUT RECOVERY DURING RESUMPTION FROM OUTAGE SCENARIOS

(71) Applicant: Samsung Electronics Co., Ltd., Gyeonggi-do (KR)

(72) Inventors: Pradeep Dwarakanath, Bangalore (IN); Anies Shaik Sulaiman, Bangalore (IN); Pushpa Ramu, Bangalore (IN); Gopal Peyam Murugesan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 81 days.

(21) Appl. No.: 15/137,403

(22) Filed: Apr. 25, 2016

(65) Prior Publication Data

US 2016/0315736 A1    Oct. 27, 2016

(30) Foreign Application Priority Data

Apr. 24, 2015   (IN) ............................ 2101/CHE/2015
Apr. 7, 2016    (IN) ............................ 2101/CHE/2015

(51) Int. Cl.
| | |
|---|---|
| *H04L 1/16* | (2006.01) |
| *H04L 12/24* | (2006.01) |
| *H04W 24/02* | (2009.01) |
| *H04L 12/26* | (2006.01) |
| *H04W 24/04* | (2009.01) |
| *H04L 1/18* | (2006.01) |
| *H04L 12/841* | (2013.01) |
| *H04L 12/835* | (2013.01) |
| *H04W 28/02* | (2009.01) |
| *H04L 12/801* | (2013.01) |

(52) U.S. Cl.
CPC ........ *H04L 41/0654* (2013.01); *H04L 1/1848* (2013.01); *H04L 1/1854* (2013.01); *H04L 1/1896* (2013.01); *H04L 43/103* (2013.01); *H04W 24/02* (2013.01); *H04W 24/04* (2013.01); *H04L 1/1685* (2013.01); *H04L 47/283* (2013.01); *H04L 47/30* (2013.01); *H04L 47/34* (2013.01); *H04W 28/0278* (2013.01)

(58) Field of Classification Search
CPC . H04L 41/0654; H04L 1/1848; H04L 1/1854; H04L 1/1896; H04L 43/103; H04W 24/02; H04W 24/04
USPC .......................................... 370/216
See application file for complete search history.

(56) References Cited

U.S. PATENT DOCUMENTS

| | | |
|---|---|---|
| 8,761,788 B2 | 6/2014 | Rajurkar et al. |
| 2004/0148396 A1* | 7/2004 | Meyer ................... H04L 1/1685 709/227 |

(Continued)

*Primary Examiner* — Sai Ming Chan
(74) *Attorney, Agent, or Firm* — The Farrell Law Firm, P.C.

(57) ABSTRACT

A method of enabling downlink (DL) flow control in a high speed packet access (HSPA) network is provided. The method includes detecting, by a user equipment (UE) radio link control (RLC) layer, at least one missing packet data unit (PDU) during a radio frequency (RF) outage in a dual subscriber identity module (SIM) dual standby (DSDS) operation, triggering, by the UE RLC layer, a status PDU indicating the at least one missing downlink PDU, transmitting, by the UE RLC layer, the status PDU to the HSPA network, and receiving, by the UE RLC layer, the at least one missing PDU, which is re-transmitted from a HSPA network RLC layer.

17 Claims, 7 Drawing Sheets

(56) References Cited

U.S. PATENT DOCUMENTS

| | | | |
|---|---|---|---|
| 2010/0029280 A1* | 2/2010 | Tenny | H04W 36/02 455/436 |
| 2013/0260761 A1 | 10/2013 | Walke et al. | |
| 2014/0334442 A1* | 11/2014 | Kanamarlapudi | H04W 36/0022 370/331 |
| 2015/0043337 A1* | 2/2015 | Kanamarlapudi | H04W 72/1252 370/230 |
| 2015/0372788 A1* | 12/2015 | Xiao | H04L 1/08 714/748 |
| 2016/0191375 A1* | 6/2016 | Gopala Krishnan | H04L 45/22 370/217 |

* cited by examiner

METHOD AND EQUIPMENT FOR THROUGHPUT RECOVERY DURING RESUMPTION FROM OUTAGE SCENARIOS

PRIORITY

This application claims priority under 35 U.S.C. § 119(a) to Indian Provisional Patent Application Serial No. 2101/CHE/2015 (PS), which was filed on Apr. 24, 2015 in the Indian Intellectual Property Office, and to Indian Complete Patent Application Serial No. 2101/CHE/2015 (CS), which was filed on Apr. 7, 2016 in the Indian Intellectual Property Office, the entire disclosure of each of these applications is incorporated herein by reference.

BACKGROUND

1. Field of the Disclosure

The present disclosure relates generally to high speed packet access (HSPA) packet-switched data transmission and reception, and more particularly, to a system and method for providing artifact recovery mechanisms from outage scenarios in radio link control (RLC) and medium access control (MAC) layer protocol.

2. Description of the Related Art

Radio access technology is evolving towards fully packet based, flat architectural solutions in order to improve system capacity, increase end-user data rates and reduce latency. The flat architecture and fully packet based technology is a cost efficient solution that increases the competitiveness of the 3rd Generation Partnership Project (3GPP) technologies. Internet-HSPA (I-HSPA) streamlines the evolutional path from 3G systems to long term evolution (LTE). The aim of I-HSPA is to phase out parallel circuit switched infrastructure and to operate as packet switched only, decreasing complexity and cost. The high rate, fully packet based radio access solutions enable the migration of the packet services from the Internet to mobile based technologies.

Generally, in dual subscriber identity module (SIM) dual standby (DSDS) wireless communication terminals, a single radio frequency (RF) transceiver is shared between two active stacks to provide a dual active experience to the user. Since the RF transceiver is shared, during communication, a communication link between the terminal and one network will be interrupted while the terminal maintains communication with the other network. The higher layers of the communication network, such as transmission control protocol (TCP) layer, RLC layer and MAC layer however, are unaware of such momentary network outages, which in turn may lead to loss of data packets. The duration for which the RF outage is being observed can be identified as RF gap ($T_{RF-GAP}$), which is the time period between a start of the RF outage and recovery from the RF outage. Although recovery mechanisms are in place, the network (NW) configured parameters can sometimes cause delay in recovery of the missed data packets. This impairs achievable throughput to normal levels.

For example, consider a scenario for recovering missing packet data units (PDUs) during RF outage, as described in FIG. 1, which is a schematic representation of a recovery time for the missing PDUs, according to a related art illustration. According to the FIG. 1, $T_{RF-GAP}$ is the duration of RF gap where the user equipment (UE) is not able to either receive or transmit any data in a mobile network. Recovery of these missed PDUs is normally handled using standard procedures of a T1 timer and status prohibit timers $T_{SP}$ that incur a longer recovery delay. Typically, the T1 timer duration may be defined according to Equation (1) as follows:

$$T1 = T_{HARQ} N_{RETX} \ldots, \qquad (1)$$

where $T_{HARQ} = N_{HARQ} * 2$ ms, $N_{HARQ}$ is the number of HARQ processes configured in a downlink (DL) and $N_{RETX}$ is the maximum number of times the network attempts to retransmit the DL transmission sequence numbers (TSNs). There are two distinct cases of RLC PDUs or MAC TSNs missed by the UE during the RF gap and are referred as Trigger 1 and Trigger 2.

During the Trigger 1, the missing PDUs are detected at the UE's RLC layer before the UE encounters an RF gap. However the UE may not be able to report this to the network due to the status prohibit timer running or due to RF gap encountered during the time of transmission. The time taken to recover the missing PDUs that were detected before the RF gap is $T_{GAP-MPR}$ and can be represented through the Equation (2) as follows:

$$T_{GAP-MPR} = T_{RF-GAP} + T_{SPRemaining} + T_{NWRETX} \qquad (2)$$

During the Trigger 2, the missing PDUs are detected at the UE's RLC layer after the UE has recovered from the RF gap. The RLC layer then raises a trigger for status PDU creation. The time taken to recover the missing PDUs during the RF gap can be expressed as $T_{MPR}$ and is given by the Equation (3) as follows:

$$T_{MPR} = T_{FirstTSN} + T_1 + T_{SPRemaining} + T_{NWRETX} \ldots, \qquad (3)$$

where $T_{FirstTSN}$ is the time gap between the RF resume and a first TSN received successfully, $T_{SPRemaining}$ is the duration of the status prohibit timer remaining before expiry and $T_{NWRETX}$ is the time taken by the network to make RLC retransmissions for the missing PDUs.

According to the scenario described in FIG. 1, the UE sending status PDU according to the rules of the status prohibit timer and settings or poll bit set in DL PDU is a part of the RLC specification. The UE sets the poll bit to solicit status PDU received from the network according to the conditions like poll periodic expiry, poll prohibit expiry, last status PDU, last PDU and the like is also a part of the specification. Further, the UE sending status indicator to indicate buffer status to the network during the status prohibit timer expiry is also a part of the MAC protocol specification.

Thus, there is a need for artifact recovery mechanisms that consider information from TCP layer outage, physical layer outage and communication channel conditions to reduce a delay in data resumption from outage scenarios and provide better utilization of radio resources i.e., uplink (UL) and DL grants.

SUMMARY

In accordance with an aspect of the present disclosure, there is provided a method of enabling DL flow control in an HSPA network. The method includes detecting, by controller of the UE, at a RLC layer of the UE, at least one missing PDU during RF outage in DSDS operation, triggering, by the controller at the RLC layer, a status PDU indicating the at least one missing PDU, transmitting, by the controller at the RLC layer, the status PDU to the HSPA network, and receiving, by the controller at the RLC layer, the at least one missing PDU, which is re-transmitted from a network RLC layer.

In accordance with an aspect of the present disclosure, there is provided a method of enabling UL flow control in a HSPA network. The method includes transmitting, by a controller of a UE, an unacknowledged PDU with a poll bit set to the HSPA network to indicate at least one missing PDU after recovering from RF outage, receiving a status packet data units (PDU) from the HSPA network, which provides information on the at least one missing PDU that was missed due to the RF outage or RF sharing in support of dual subscriber identity module (SIM) dual standby (DSDS) operation, and initiating, by the controller at a RLC layer of the UE, a UL retransmission of the at least one missing PDU on receiving the status PDUs from the HSPA network.

In accordance with an aspect of the present disclosure, there is provided a method of enabling UL data control in a HSPA network. The method includes receiving, by a controller of a UE, at least one UL status PDU a plurality of times within a time duration at an RLC layer of the UE, and sending, by the UE, a scheduling information to the HSPA network to indicate a buffer status for obtaining a proportional scheduling grant for resuming uplink transmission of the at least one status UL PDU, wherein the UE transmits the SI to the HSPA network without waiting for a signaling (SIG) timer expiry.

In accordance with an aspect of the present disclosure, there is provided a user equipment including a controller configured to detect, at a radio link control (RLC) layer of the UE, at least one missing packet data unit (PDU) during a radio frequency (RF) outage in a dual subscriber identity module (SIM) dual standby (DSDS) operation, trigger, at the RLC layer, a status PDU indicating the at least one missing PDU, transmit, at the RLC layer, the status PDU to the HSPA network, and receive, at the RLC layer, the at least one missing PDU, which is re-transmitted from a network RLC layer.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
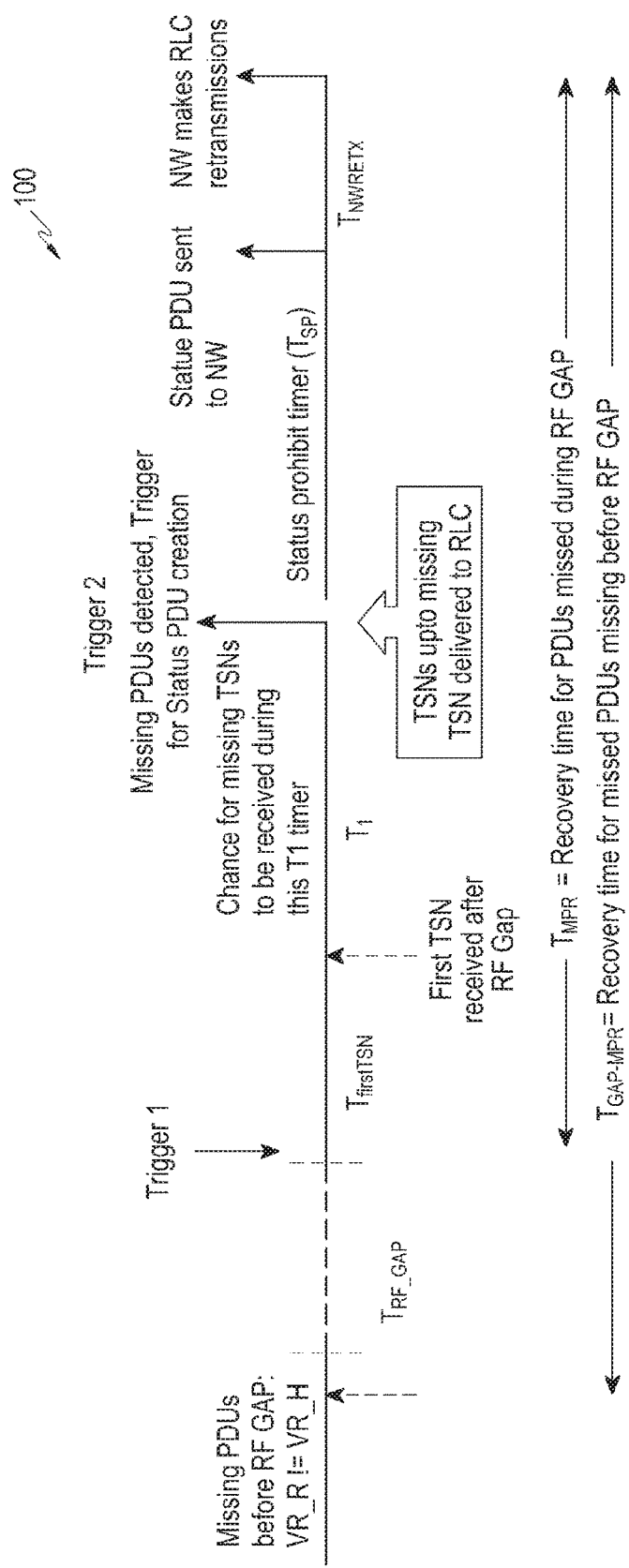
FIG. 1 is a diagram of a recovery time for missing PDUs.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features. The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Disclosed herein is a system and method for providing recovery mechanisms from outage scenarios in RLC and MAC layer protocols in HSPA networks.

Disclosed herein is a system and method for enabling UL/DL flow control in HSPA networks. One of ordinary skill in the art will appreciate that various modifications can be made to the methods described herein to provide a recovery mechanism during an RF outage, without departing from the scope of the invention.

After resuming/recovering from an RF outage, a controller of a UE has to quickly detect the number of missing PDUs in the DL and also indicate the detected number to the HSPA network. The indication should be sent in such a way so as to minimize the number of duplicate PDUs, which eventually get discarded at the UE, that are sent by the network. The UE also has to quickly request for a status PDU from the HSPA network indicating a reception status of the UE's UL transmissions. Further the UE has to indicate its buffer occupancy status to the HSPA network, so that the HSPA network can allocate proportionate grants to the UE.

According to an embodiment of the present disclosure, a method of enabling UL/DL flow control in HSPA networks includes detecting, by an RLC layer, one or more missing PDUs due to an RF outage or RF sharing in support of Dual subscriber identity module (SIM) Dual Standby (DSDS) operation. A UE with two or more SIM capability, called as dual/multi SIM UE, performs the DSDS operation, wherein the dual/multi SIM UE includes of two or more SIMs which are associated with two or more radio access technologies (RATs). The UE includes of two or more SIMs that are under the control of a controller of the UE, but the UE can include only one transceiver and the transceiver can be shared between the SIMs for transmission and reception of data packets over RF. According to the DSDS operation, if one SIM is in active state, then the other SIM will be in idle/sleep state, and can switch to active state periodically to receive the data packets during paging process.

During RF outage, the SIM fails to transmit or receive one or more PDUs from the HSPA network. The controller of the UE at the RLC layer can detect one or more PDUs which are missing during the RF outage. The RLC layer (under the control of the controller) identifies the missing PDUs based on the PDU identifier. The RLC layer can also identify the missing PDUs based on the missing acknowledgement for the PDU, which should be received as confirmation for successful transmission. One having ordinary skill in the art will appreciate that any of the known mechanism for detecting missing PDUs during RF outage can be used, without departing from the scope of the present disclosure.

Three solutions for enabling UL/DL flow control in HSPA networks, such as recovery of PDUs in a DL path, recovery of PDUs in an UL path, and recovery of UL MAC grants, are herein described.

In relation to the occurrence of an RF gap, the missing PDUs can be classified into 2 categories as:

a. The PDUs missed and RLC detected the missing PDUs before the RF gap. The time taken to recover these missing PDUs are represented as $T_{GAP-MPR}$ b. The PDUs missed and RLC detected the missing PDUs after the RF gap. The time taken to recover these missing PDUs is represented as $T_{MPR}$.

Figure 2:
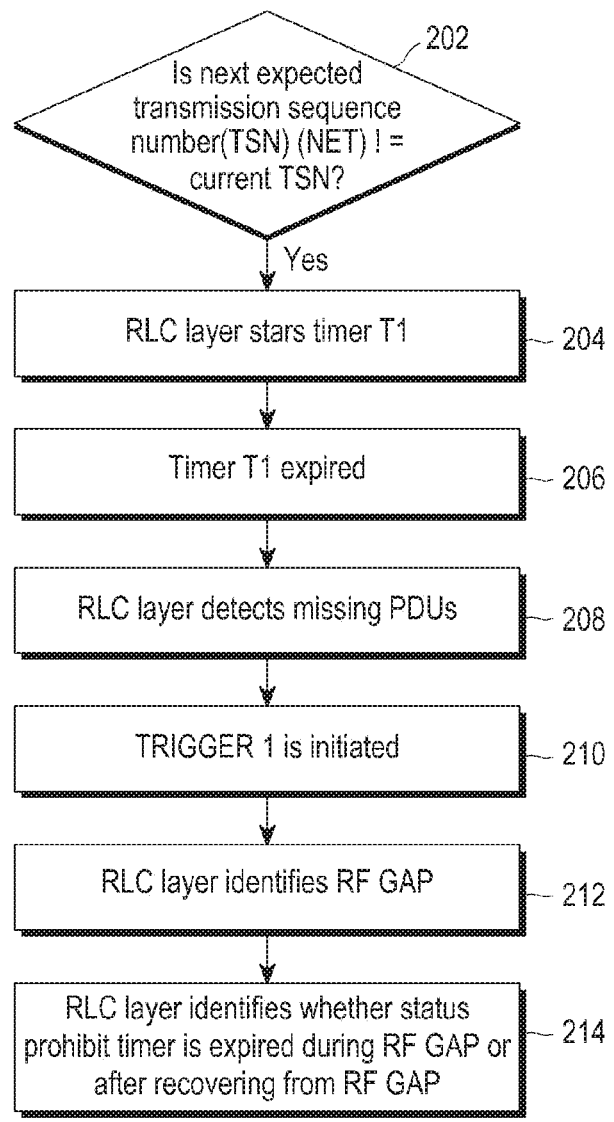
FIG. 2 is a flow chart illustrating a method for triggering a status PDU generation, according to an embodiment of the present disclosure.

FIG. 2 is a flow chart illustrating a method for triggering a status PDU generation, according to an embodiment of the present disclosure. In order to minimize $T_{GAP-MPR}$ (maximum power reduction), a first trigger TRIGGER 1 for indicating missing PDUs during normal operation has to be sent soon after resumption from an RF gap. The trigger for status PDU generation, TRIGGER 1 is raised just before the UE encounters the RF gap.

At step 202, an RLC layer checks whether the next expected transmission sequence number (TSN) (NET) for transmission of PDUS is equal to a current TSN. If the NET is not equal to the current TSN, the RLC layer identifies that there are PDUs with TSNs that are missing. Upon identifying the missing TSNs, at step 204, the RLC layer starts a timer T1.

After a pre-determined time set for the timer T1, at step 206, the timer T1 expires. At step 208, the RLC layer detects the missing PDUs. Based on the missing PDUs, at step 210, a UE initiates TRIGGER 1, wherein the TRIGGER 1 sends the status PDU to the HSPA network (hereinafter "network") when a receive state variable VR_R is less than a highest expected state variable VR_H just before the UE encounters the RF gap. VR_R is a sequence number of the next in-sequence PDU expected to be received. It is set equal to SNmax+1 upon receipt of the next in-sequence PDU, wherein SNmax is the sequence number of the highest received in-sequence PDU. The initial value of the VR_R variable can be set to 0. Further, VR_H is a sequence number of the highest expected PDU. This state variable is set equal to SN+1 only when a new PDU is received with VR(MR)> SN≥VR(H). The initial value of the VR_H variable can be set to 0. At step 212, the RLC layer identifies the RF gap. At step 214, the RLC layer identifies whether the status prohibit timer is expired during/after RF gap, or after recovering from the RF gap.

To minimize $T_{MPR}$, the UE has to wait for the first MAC Handle Scheduling (MAC-HS) or MAC-eHS block to be correctly received at the MAC. If the first received TSN after the RF gap is not the NET, it implies that there are missing PDUs during the RF gap. Hence optimization can be achieved by minimizing T1 duration and $T_{SPRemaining}$ duration. Here the UE raises a second trigger TRIGGER 2 soon after the UE resumes from RF gap due to a T1 timer expiry during the RF gap.

Figure 3:
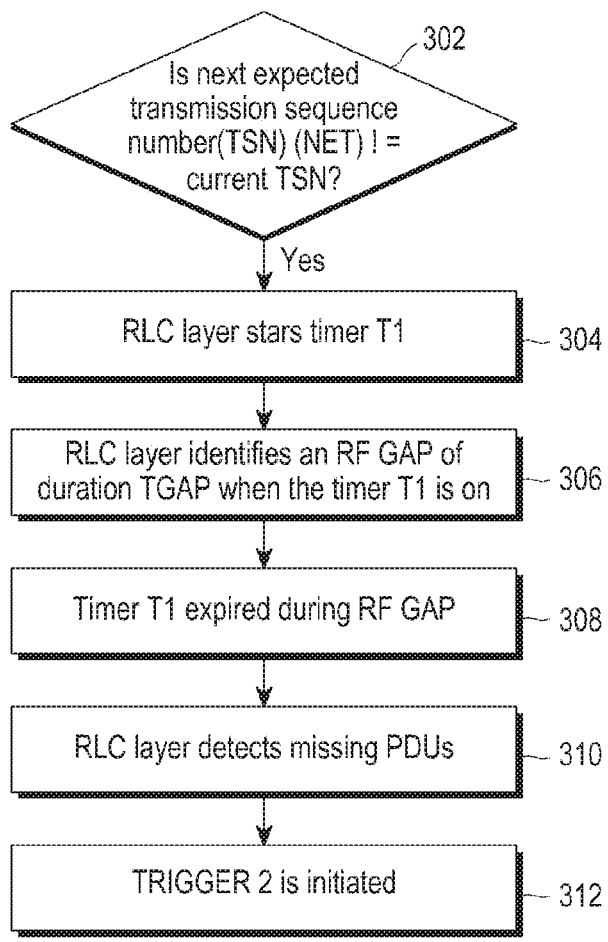
FIG. 3 is a flow chart illustrating a method for triggering a status PDU generation, according to an embodiment of the present disclosure.

FIG. 3 is a flow chart illustrating a method for triggering a status PDU generation, according to an embodiment of the present disclosure. At step 302, the RLC layer checks whether the NET for transmission of PDUs is equal to the current TSN associated with the PDUs. If the NET and current TSN are not equal, then the RLC layer identifies that one or more PDS are missing.

Subsequently, at step 304, the RLC layer starts the timer T1. At step 306, the RLC layer identifies an RF gap of a duration $T_{GAP}$ when the timer T1 is on. At step 308, the timer T1 expires when the UE is in the RG gap. Based on the timer T1, and the RF gap, at step 310, the RLC layer identifies the missing PDUs in communication with the UE. Thus, at step 312, the UE initiates TRIGGER 2, wherein the TRIGGER 2 sends status PDU to the network when the PDUs are missed during the RF gap.

According to FIGS. 2 and 3, the UE sends a status PDU to the network soon after resumption from the RF gap. Further, the UE need not have to wait for the first TSN to be received from the DL to detect a RF gap. As evident from FIG. 3, it can be noted that the status prohibit remaining time $T_{SPRemaining}$ is the only tunable parameter and hence any optimization of this time is handled in optimized status prohibit handling logic. Hence, when either TRIGGER1 or TRIGGER2 is raised, the input is fed into optimized status prohibit handling logic, which then decides to send the status PDU to the network.

With insights into the HARQ operation and the duration of RF pause, it can be inferred that if $T_{RF-GAP}$ is longer than timer T1, and waiting for expiration of the timer T1 after RF resumes brings no advantage as the network MAC layer will not attempt to retransmit the missed TSNs. In such cases, timer T1 can be ignored and the received TSNs can be delivered to the RLC layer without delay. Further, if $T_{RF-GAP}$ is less than timer T1, then there is a possibility to receive the TSNs through MAC level HARQ retransmissions. Hence, timer T1 duration can be modified to wait for one HARQ cycle to receive any missed TSNs. After one HARQ cycle ($T_{HARQ}^{DL}$), the probability of reception of missed TSNs is quite negligible. Hence, the optimized timer T1 duration can be defined by Equation (4):

$$T1_{Opt} = \begin{cases} T_{HARQ}^{DL}, & T_{RF\_GAP} < T_{HARQ}^{DL} * N_{RETX} \\ 0, & T_{RF\_GAP} \geq T_{HARQ}^{DL} * N_{RETX} \end{cases} \quad (4)$$

Figure 4:
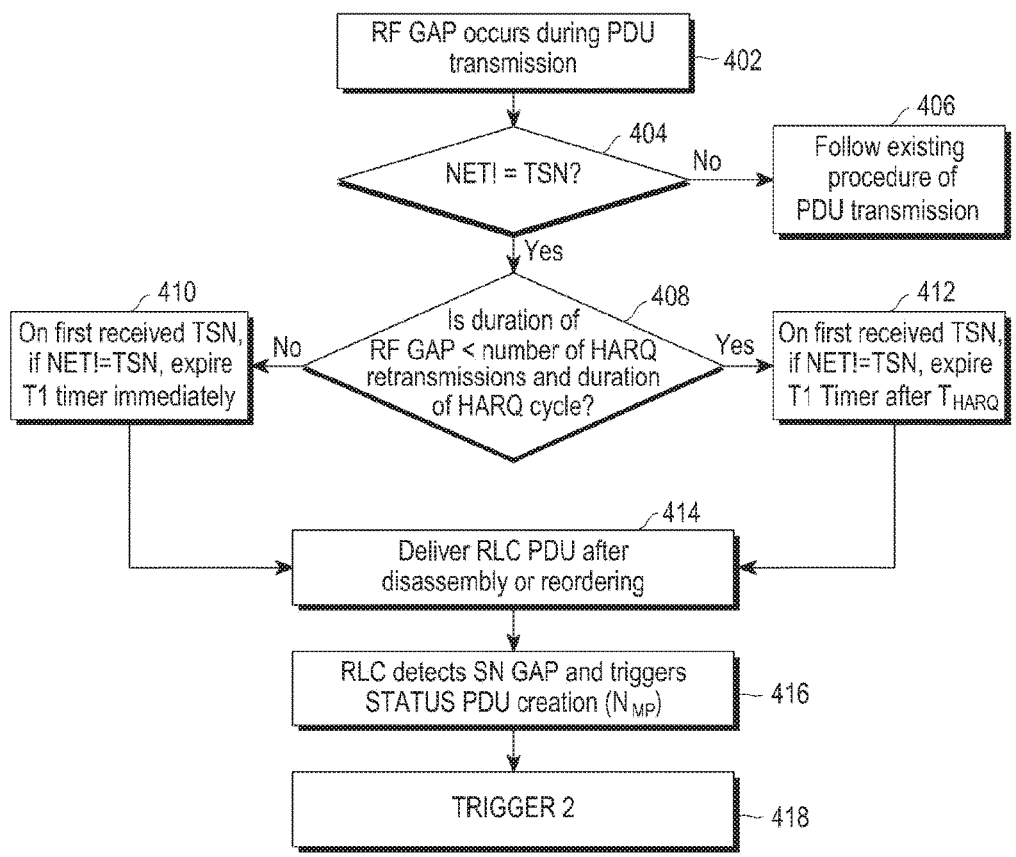
FIG. 4 is a flow chart illustrating a method of a trigger for status PDU creation and transmission for missed PDUs during RF Outage, according to an embodiment of the present disclosure.

FIG. 4 is a flow chart illustrating a method of a trigger for status PDU creation and transmission for missed PDUs during RF Outage, according to an embodiment of the present disclosure. At step 402, an RF gap of a duration $T_{RF-GAP}$ occurs when PDUs are being transmitted between the network and the UE. At step 404, a MAC layer checks whether the NET is equal to the current TSN and thus identifies that there are missing TSNs. If not, then at step 406, the MAC layer follows the existing procedure of transfer of PDUs to the RLC. If yes, then at step 408, the MAC layer further checks whether a duration of the RF gap is smaller than a product of a number of HARQ retransmissions $N_{HARQ\_RTEX}$ and duration of HARQ cycle $T_{HARQ\_CYCLE}$. If no at step 408, then at step 410, on a first received TSN, if the NET is not equal to TSN, then the MAC layer expires the timer T1 immediately and proceeds to step 414. If yes, then at step 412, on first received TSN, if NET is not equal to TSN, then the MAC layer expires the timer T1 after HARQ cycle duration $T_{HARQ\_CYCLE}$.

At step 414, all the MAC PDUs can be delivered after disassembly or reordering. At step 416, the RLC layer detects SN GAP and triggers STATUS PDU creation. Based on the triggered status PDU, at step 418, TRIGGER 2 can be triggered by the RLC layer.

The method described herein provides an optimal way of handling a status prohibit timer, wherein the main aim is to avoid transmission of too many status PDUs to the network, which causes the network to retransmit too many DL PDUs. The triggers, either TRIGGER1, or TRIGGER2, or both, are fed into the status prohibit timer handling logic that regulates the number of Status PDUs transmitted to the network based.

Figure 5:
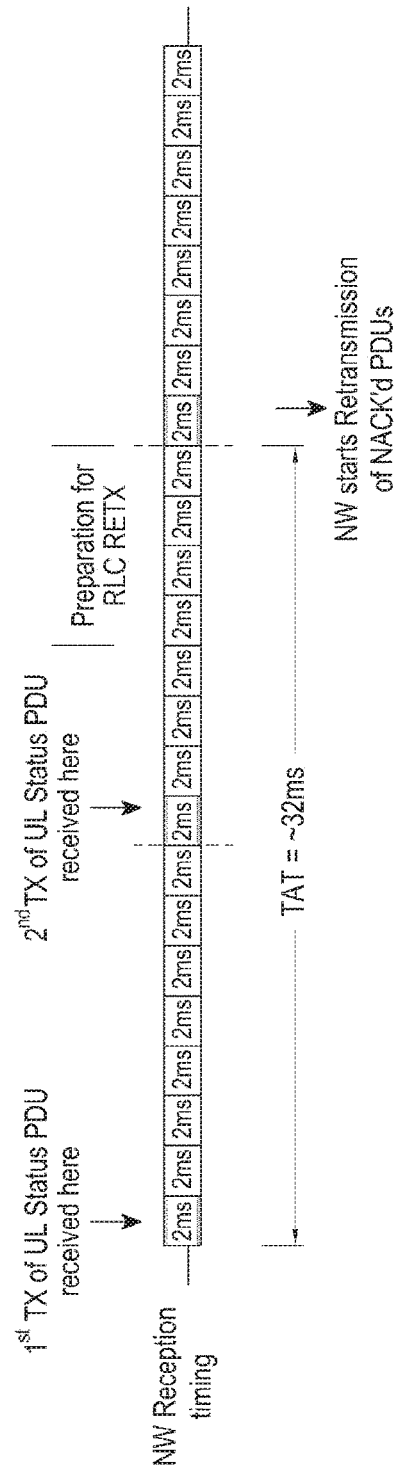
FIG. 5 is timing diagram illustrating a method for determining a least possible turn-around time for a network to start PDU retransmissions, according to an embodiment of the present disclosure.

FIG. 5 is timing diagram illustrating a method for determining a least possible turn-around time for a network to start PDU retransmissions, according to an embodiment of the present disclosure. A round trip time is estimated for the network to respond to the UE with retransmissions of missing PDUs. Assuming that it takes 2 HARQ transmissions, initially a first transmission and then a second retransmission for the first transmission, for the status PDU to be successfully decoded at the network and a UL HARQ Cycle duration ($T_{HARQ}^{UL}$) of 16 ms (for 2 ms TTI) and a DL HARQ cycle ($T_{HARQ}^{DL}$) for scheduling the retransmissions, the retransmission of missing PDUs cannot expected from the network before ~50 ms. Hence $T_{TAT-AP}$ is chosen as 50 ms. If the network configured status prohibit timer duration is less than 50 ms, then the UE could end up sending excess number of status PDUs, i.e., the PDUs turn out to be redundant.

Figure 6:
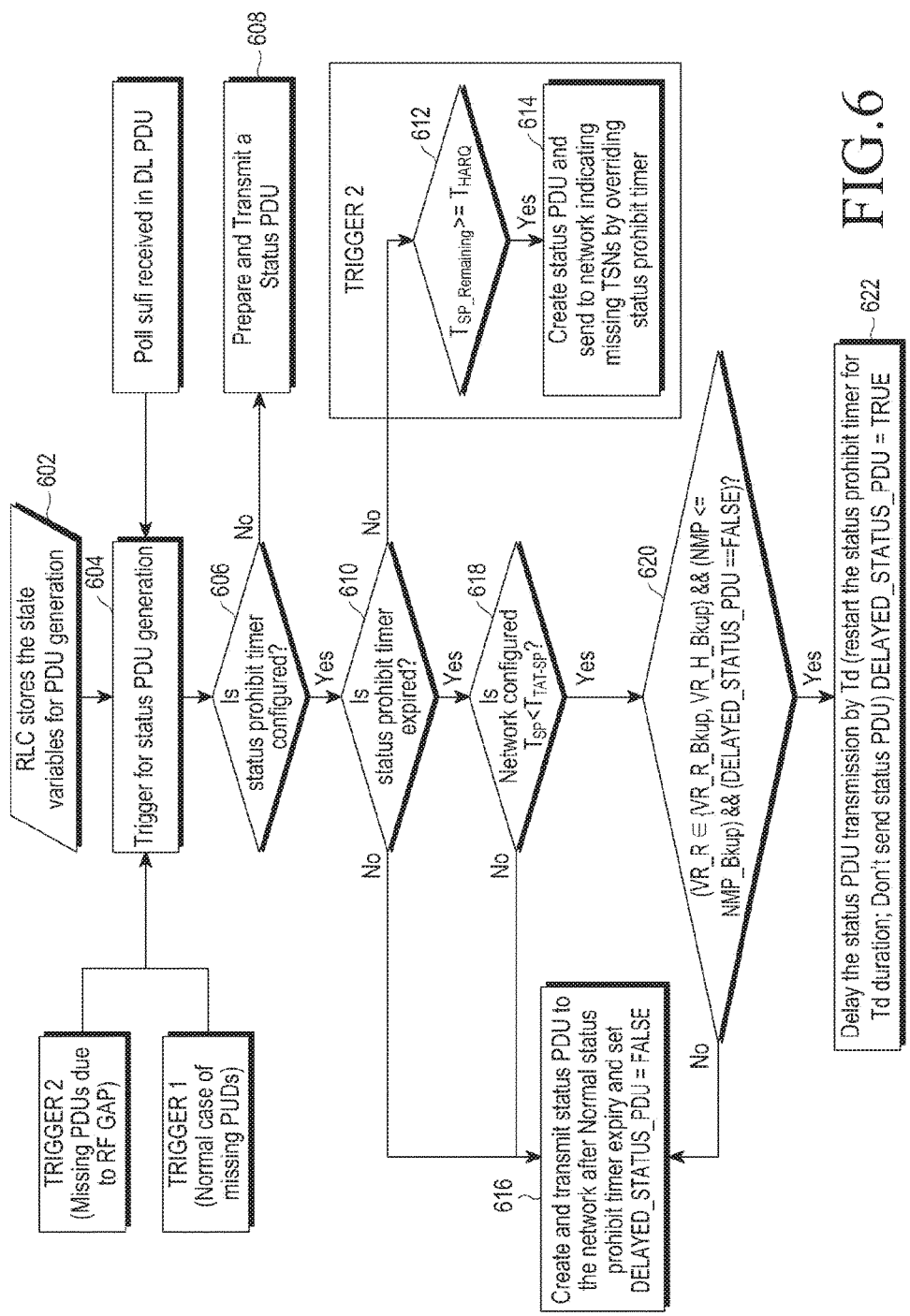
FIG. 6 is a flow chart illustrating a method for enabling optimized status PDU transmission, according to an embodiment of the present disclosure.

FIG. 6 is a flow chart illustrating a method for enabling optimized status PDU transmission, according to an embodiment of the present disclosure. At step 602, at the time of sending a status PDU, RLC stores the state variables for PDU generation. Here, the state variables include, but are not limited to, current VR_R, current VR_H, number of missing PDUs ($N_{MP}$), and the like. The state variables are backed up as VR_R_Bkup, VR_H_Bkup, and $N_{MP\_Bkup}$. At step 604, status PDU generation can be triggered, wherein the trigger can be TRIGGER1 and TRIGGER2, and wherein TRIGGER 1 can be triggered for any of the missing PDU situations, and TRIGGER 2 can be triggered for missing PDUs due to a RF gap. The status PDU generation trigger can also be influenced by polling information received during DL PDU.

At step 606, RLC layer checks whether status prohibit timer $T_{SP}$ is configured. If no, at step 608, the UE can prepare and transmit the status PDU. If yes, at step 610, it is further checked whether status prohibit timer $T_{SP}$ is expired or not running. If the $T_{SP}$ is not expired or not running, and TRIGGER 2 was triggered, at step 612, it is further checked whether $T_{SPRemaining} \geq T_{HARQ\_CYCLE}$. If yes, at step 614, the UE can immediately create status PDU and send it to the network indicating the missing TSNs, wherein sending the missing TSNs can be done by overriding the status prohibit timer.

If the $T_{SP}$ has not expired or not running, and TRIGGER 1 was triggered, at step 616, then the UE identifies it as normal status prohibit expiry and thus creates and transmits a status PDU along with setting the status of DELAYED_STATUS_PDU as false. If the $T_{SP}$ is expired/not running, at step 618, it is further checked whether the network configured $T_{SP}$ is less than $T_{TAT\_SP}$. If no, at step 616, the UE identifies it as normal status prohibit expiry and creates and transmits a status PDU along with setting the status of DELAYED_STATUS_PDU as false. If yes, at step 620, VR_R is checked to determine if it belongs to $V_{R\_R\_Bkup}$ and $V_{R\_H\_Bkup}$, and if $N_{MP}$ is less than or equal to $N_{MP\_Bkup}$, and if DELAYED_STATUS_PDU is equal to false. If no, at step 616, the UE identifies it as normal status prohibit expiry and creates and transmits a status PDU along with setting the status of DELAYED_STATUS_PDU as false. If yes, at step 622, the status PDU transmission can be delayed by Td. Further, the status prohibit timer can be restarted for $T_d$ duration and the transmission of the status PDU can be withheld for the $T_d$ duration. Based on the restarted $T_d$ duration, the status of DELAYED_STATUS_PDU can be set as true.

On the next trigger for status PDU creation, if the latest current VR_R and VR_H are within the window of backed-up VR_R and VR_H, and if the $T_{SP}$ is shorter than the round trip time $T_{TAT-AP}$, then the transmission of status PDU is delayed by $T_d$. Alternatively, if the missing PDUs are detected due to an RF outage/Gap, and if $T_{SPRemaining} > T_{HARQ}^{DL}$, then the status prohibit timer can be prematurely terminated and status PDU is transmitted.

The present system and method allows recovery of missing PDUs using an UL path. A quick UL PDU retransmission scheme is provided, wherein the retransmission of missing PDUs not decoded at the network can possibly be initiated sooner than standard based procedures. In the event of recovery from RF outage, a poll bit may be set in the first UL PDU, without waiting for poll timer, poll prohibit timer or poll periodic timer to expire to solicit the "reception status" of UL transmitted PDUs at the network. The network may configure all the criteria or a sub-set of criterion for setting the poll bit. Further, when the UE resumes from the RF gap, it sets the poll bit in the UL PDU transmitted. Further, the UE shall over-ride the poll prohibit timer, if configured and running. Further, the UE shall restart the poll timer on transmission of this PDU that had the poll bit set. Further, the present system and method assists in reception of status PDUs in DL if one was missed during RF gap. In Tx window full cases, it helps for quick reception of missing PDUs and transmission windows at RLC moves continues.

The embodiments discussed herein allow for recovery of missing PDUs using UL MAC grants. Currently, pausing of UL transmission in DSDS system can cause resources allocated for UL transmission to not be utilized by UE during an RF pause, which may cause the network to reduce UL grants when UE resumes data transfer. Further, after primary stack resumes from RF pause, a bulk delivery of TCP packets (formed out of PDUs recovered after RF pause and PDUs received during $T_{MPR}$) is made to TCP at once causing a surge in instantaneous throughput and TCP layer releases corresponding ACK packets to lower layers and causes a sudden increase in buffer occupancy (BO) at MAC.

If UL MAC is operating with reduced grants, the transmission of TCP ACK packets to the network gets slower leading to increased RTT. If $N_{BO}$ is the BO in number of PDUs and $N_{SG}$ is the number of PDUs that can be transmitted in 1 TTI with the current serving grant (SG), then the number of TTIs ($N_{TTI}$) required to transmit the current buffer occupancy (BO) is $$N_{TTI} = \frac{N_{BO}}{N_{SG}}.$$

The UE may request for higher grants by sending scheduling information (SI). However SI transmission can be made on expiry of SIG timer ($T_{SIG}$) that checks the frequent transmission of SI to the network.

In order to improve RTT, the sudden surge in BO has to be detected at MAC and SI indicating the high BO should be conveyed to the network seeking higher scheduling grant (SG) irrespective of any procedures that may prohibit SI transmission. The idea is to identify a sudden surge of UL status PDUs at RLC layer and sending a scheduling information to the network requesting higher grants. The UE may send the SI without waiting for any SIG timer that may be running at the time of recovery from RF outage. This would ensure that the network grants are not delayed due to a long SIG timer or a SIG timer miss aligned with the arrival of status PDUs to RLC layer.

Figure 7:
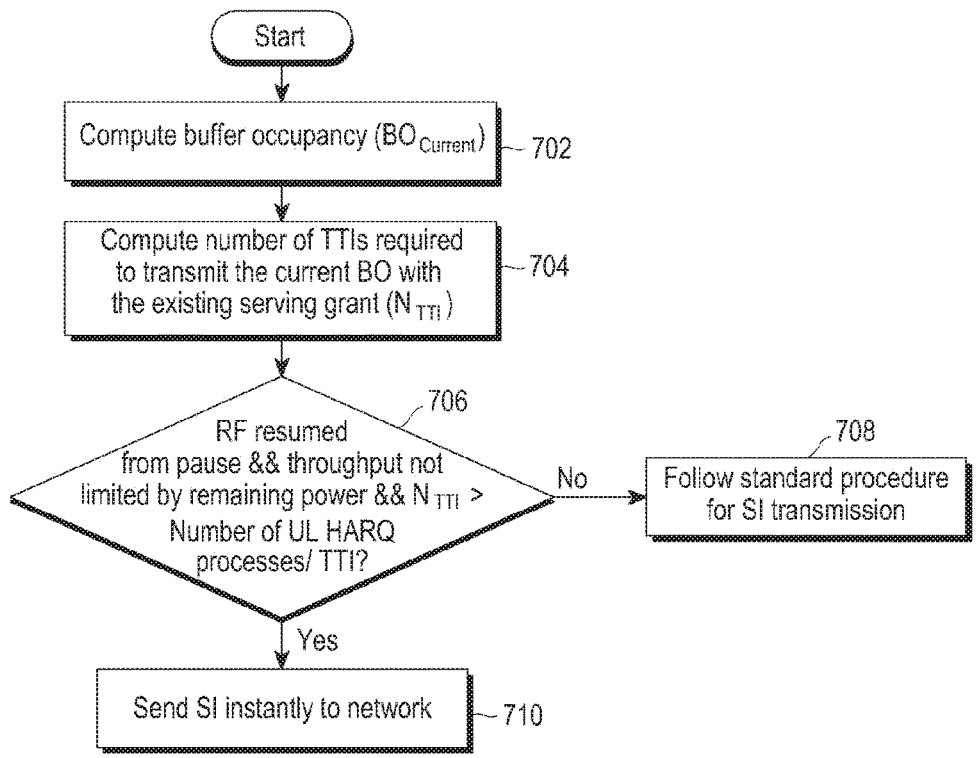
FIG. 7 is a flow chart illustrating a method for enabling optimized SI transmission to request the network to enhance the serving grant, according to an embodiment of the present disclosure.

FIG. 7 is a flow chart illustrating a method for enabling optimized SI transmission to request the network to enhance the serving grant, according to an embodiment of the present disclosure. At step 702, current buffer occupancy (BOcurrent) can be computed. At step 704, a number of TTIs ($N_{TTI}$) required to transmit the current BO with the existing serving grant can be computed. At step 706, it is checked whether RF has resumed from pause, whether throughput is not limited by remaining power of the UE, and whether $N_{TTI}$ is greater than a number of UL HARQ processes per TTI. If yes, at step 708, the UE can send SI forcefully. If no, at step 710, the standard defining procedure can be followed for SI transmission.

During RF pause, the network would transmit packets for 1 DL HARQ cycle (i.e. $N_{HARQ}^{DL}$ TTIs) and resort to HARQ retransmissions due to no response from UE. Depending on RF Pause Gap duration, two cases can be analyzed with respect to window operation at TCP and RLC.

Case 1: If $T_{RF\text{-}GAP} \leq T_{HARQ}^{DL} \times N_{RETX}$, UE MAC would receive and acknowledge further transmissions on RF resumption and if status PDU and TCP ACK PDUs are sent within one UL HARQ cycle (i.e. $N_{HARQ}^{UL}$ TTIs), normal window operation resumes at RLC and TCP layers.

Case 2: On the other hand if $T_{RF\text{-}GAP} > T_{HARQ}^{DL} \times N_{RETX}$, RLC and TCP windows stall due to non-reception of ACKs. On RF resumption, the status PDUs and TCP ACK PDUs should be transmitted as quickly as possible to pull the RLC and TCP layers out of window stall.

In both cases, for efficient window operation at RLC and TCP after an RF resumption, it is desirable to have sufficient grants to clear the BO within $T_{HARQ}^{UL}$. Hence the criteria for forceful transmission of SI on RF resumption may be set as $N_{TTI} > N_{HARQ}^{UL}$.

For UL TTI Duration of 2 ms and 10 ms (14) translates to forceful transmission of SI if BO is higher than that could be transmitted with the existing serving grant within 16 ms and 40 ms respectively. According to an embodiment of the present invention, fake buffer status can be reported to indicate high BO in the case of wide gap between VT_S and VTA (Ex: (VT_S−VT_A) mod configured_Window_Size>40% of Configured Window Size).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of enabling downlink (DL) flow control in a network, the method comprising:
   detecting, by a controller of a user equipment (UE), at a radio link control (RLC) layer of the UE, at least one missing packet data unit (PDU) based on a time duration from a media access control (MAC) layer of the UE during a radio frequency (RF) outage in a dual subscriber identity module (SIM) dual standby (DSDS) operation;
   triggering, by the controller at the RLC layer, a status PDU indicating the at least one missing PDU;
   transmitting, by the controller at the RLC layer, the status PDU to the network; and
   receiving, by the controller at the RLC layer, the at least one missing PDU, which is re-transmitted from a network RLC layer,
   wherein the time duration is determined based on a number of hybrid automatic repeat request (HARQ) retransmissions, a duration of a HARQ cycle and a duration of an RF gap, which is a time period between a start of the RF outage and a recovery from the RF outage.

2. The method of claim 1, wherein the RLC layer triggers the status PDU indicating the at least one missing PDU before the UE encounters the RF outage.

3. The method of claim 1, wherein the RLC layer triggers the status PDU indicating the at least one missing PDU after the UE has recovered from the RF outage.

4. The method of claim 1, further comprising:
   triggering quick transmission of the status PDU to the network; and
   receiving at the UE, from the network, a quick retransmission of the at least one missing PDU.

5. The method of claim 1, further comprising:
   regulating, by the UE, a number of status PDUs transmitted to the network by optimizing an expiry of a status prohibit timer, thereby preventing re-transmission of duplicate downlink PDU's to the network.

6. The method of claim 5, further comprising:
   checking, by the controller at the RLC layer, if a remaining time for expiry of the status prohibit timer is larger than a HARQ round trip time (RTT) when the at least one missing PDU is confirmed; and
   sending the status PDU to the network by prematurely expiring the status prohibit timer if the remaining time for expiry of the status timer is larger than the HARQ RTT.

7. The method of claim 6, wherein the UE sends the status PDU to the network by:
   initiating an early expiry of the status prohibit timer; and
   restarting the status prohibit timer after transmission of status PDU.

8. The method of claim 1, further comprising:
   reducing the number of status PDUs transmitted from the UE to the network, if a same set of missing PDUs are to be indicated by the UE and a network configured status prohibit timer duration is less than a preset time.

9. The method of claim 8, wherein the preset time is measured based on the status PDUs received from the UE for initiating retransmissions of the at least one missing PDU.

10. A method of enabling uplink (UL) flow control in a network, the method comprising:
   transmitting, by a controller of a user equipment (UE), an unacknowledged packet data unit (PDU) with a poll bit set to the network to indicate at least one missing PDU;
   receiving a status PDU from the network, which provides information on the at least one missing PDU that was missed due to the radio frequency (RF) outage or RF sharing in support of dual subscriber identity module (SIM) dual standby (DSDS) operation; and
   initiating, by the controller of at a radio link control (RLC) layer of the UE, a UL retransmission of the at least one missing PDU to the network on receiving the status PDUs from the network,
   wherein the at least one missing PDU is detected based on a time duration from a media access control (MAC) layer, and
   wherein the time duration is determined based on a number of hybrid automatic repeat request (HARQ) retransmissions, a duration of a HARQ cycle and a duration of an RF gap, which is a time period between a start of the RF outage and a recovery from the RF outage.

11. The method of claim 10, wherein the UL retransmission of the at least one missing PDU to the network is initiated by setting a poll bit in a first UL PDU being transmitted by the UE after resuming from the RF outage or the recovery from RF sharing in support of DSDS operation.

12. The method of claim 11, wherein the UE sets the poll bit in the first UL PDU without waiting for a poll prohibit timer or a poll periodic timer to expire.

13. The method of claim 10, further comprising:
   identifying, by the controller of the UE, the status PDU a plurality of times within a predetermined time duration at the RLC layer; and
   sending, by the UE, scheduling information (SI) to the network to indicate a buffer status for obtaining a proportional scheduling grant for resuming uplink transmission of the status PDU;
   wherein the UE transmits the SI to the network without waiting for a signaling (SIG) timer expiry.

14. The method of claim 13, further comprising computing a current buffer occupancy (BO).

15. The method of claim 14, further comprising computing a number of transmission time intervals (TTIs) $N_{TTI}$ required to transmit the current BO with an existing serving grant.

16. The method of claim 15, further comprising:
   checking whether RF has resumed from pause;
   checking whether throughput is not limited by a remaining power of the UE;
   checking whether $N_{TTI}$ is greater than a number of UL HARQ processes per TTI; and
   if the RF has resumed from pause, the throughput is not limited by the remaining power of the UE, and the $N_{TTI}$ is greater than the number of UL HARQ processes per TTI, sending SI forcefully.

17. A user equipment (UE) comprising:
   a controller configured to:
   detect, at a radio link control (RLC) layer of the UE, at least one missing packet data unit (PDU) based on a time duration from a media access control (MAC) layer of the UE during a radio frequency (RF) outage in a dual subscriber identity module (SIM) dual standby (DSDS) operation;
   trigger, at the RLC layer, a status PDU indicating the at least one missing PDU;
   transmit, at the RLC layer, the status PDU to the network; and
   receive, at the RLC layer, the at least one missing PDU, which is re-transmitted from a network RLC layer,
   wherein the time duration is determined based on a number of hybrid automatic repeat request (HARQ) retransmissions, a duration of a HARQ cycle and a duration of an RF gap, which is a time period between a start of the RF outage and a recovery from the RF outage.

* * * * *